US008708033B2

(12) United States Patent
Bewlay et al.

(10) Patent No.: US 8,708,033 B2
(45) Date of Patent: Apr. 29, 2014

(54) CALCIUM TITANATE CONTAINING MOLD COMPOSITIONS AND METHODS FOR CASTING TITANIUM AND TITANIUM ALUMINIDE ALLOYS

(75) Inventors: Bernard Patrick Bewlay, Niskayuna, NY (US); Joan McKiever, Niskayuna, NY (US); Brian Michael Ellis, Niskayuna, NY (US); Nicholas Vincent McLasky, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/598,164

(22) Filed: Aug. 29, 2012

(65) Prior Publication Data

US 2014/0060767 A1 Mar. 6, 2014

(51) Int. Cl.
*B22D 11/00* (2006.01)
*B22C 1/00* (2006.01)
*B22C 1/18* (2006.01)
*B22C 9/00* (2006.01)
*B22C 9/22* (2006.01)
*B22D 11/04* (2006.01)
*B22D 11/055* (2006.01)
*B28B 7/00* (2006.01)
*B28B 7/34* (2006.01)
*B29C 33/00* (2006.01)
*B29C 33/38* (2006.01)

(52) U.S. Cl.
USPC .......... 164/529; 106/38.3; 106/38.9; 106/692; 164/131; 164/361; 164/519; 264/219; 264/220; 264/221; 264/225

(58) Field of Classification Search
USPC .............. 106/38.2, 38.3, 38.9, 692; 164/131, 164/361, 519, 529; 264/219, 220, 221, 225
See application file for complete search history.

(56) References Cited

U.S. PATENT DOCUMENTS

| | | | |
|---|---|---|---|
| 2,781,261 A | 2/1957 | Kamlet |
| 2,837,426 A | 6/1958 | Kamlet |
| 3,084,060 A | 4/1963 | Baer et al. |
| 3,180,632 A | 4/1965 | Katz et al. |
| 3,565,643 A | 2/1971 | Bergna |
| 3,660,075 A | 5/1972 | Harbur et al. |
| 3,676,161 A | 7/1972 | Yates |
| 3,734,480 A | 5/1973 | Zanis et al. |
| 3,787,143 A | 1/1974 | Carbonnel et al. |
| 3,961,995 A | 6/1976 | Alliot et al. |
| 3,969,195 A | 7/1976 | Dötzer et al. |
| 4,028,096 A | 6/1977 | Banker et al. |
| 4,040,845 A | 8/1977 | Richerson et al. |
| 4,148,204 A | 4/1979 | Dötzer et al. |
| 4,356,152 A | 10/1982 | Berkman et al. |
| 4,661,316 A | 4/1987 | Hashimoto et al. |
| 4,703,806 A | 11/1987 | Lassow et al. |
| 4,710,348 A | 12/1987 | Brupbacher et al. |
| 4,723,764 A | 2/1988 | Mizuhara |
| 4,740,246 A | 4/1988 | Feagin |
| 4,746,374 A | 5/1988 | Froes et al. |
| 4,793,971 A | 12/1988 | Eckert et al. |
| 4,802,436 A | 2/1989 | Wilson et al. |
| 4,808,372 A | 2/1989 | Koczak et al. |
| 4,892,693 A | 1/1990 | Perrotta et al. |
| 4,893,743 A | 1/1990 | Eylon et al. |
| 4,919,886 A | 4/1990 | Venkataraman et al. |
| 4,951,929 A | 8/1990 | Schwarz et al. |
| 4,966,225 A | 10/1990 | Johnson et al. |
| 4,996,175 A | 2/1991 | Sturgis |
| 5,011,554 A | 4/1991 | Fleischer |
| 5,098,484 A | 3/1992 | Eylon et al. |
| 5,098,653 A | 3/1992 | Shyh-Chin |
| 5,102,450 A | 4/1992 | Huang |
| 5,139,979 A | 8/1992 | Anderson et al. |
| 5,152,853 A | 10/1992 | Fleischer |
| 5,190,603 A | 3/1993 | Nazmy et al. |
| 5,205,984 A | 4/1993 | Rowe |
| 5,263,530 A | 11/1993 | Colvin |
| 5,284,620 A | 2/1994 | Larsen, Jr. |
| 5,287,910 A | 2/1994 | Colvin et al. |
| 5,296,055 A | 3/1994 | Matsuda |
| 5,297,615 A | 3/1994 | Aimone et al. |
| 5,299,619 A | 4/1994 | Chandley et al. |
| 5,305,817 A | 4/1994 | Borisov et al. |
| 5,346,184 A | 9/1994 | Ghosh |
| 5,350,466 A | 9/1994 | Larsen, Jr. et al. |
| 5,354,351 A | 10/1994 | Kampe et al. |

(Continued)

FOREIGN PATENT DOCUMENTS

CN 1060683 4/1992
CN 101829770 9/2010

(Continued)

OTHER PUBLICATIONS

Larsen Jr., "Status of Investment Cast Gamma Titanium Aluminides in the USA", Materials science and engineering: A, International symposium on metallurgy and technology of titanium alloys, vol. 213, Issue 1-2, pp. 128-133, Aug. 15, 1996.

Aguilar et al., "Qualification of an Investment Casting Process for Production of Titanium Aluminide Components for Aerospace and Automotive Applications", Materials Science Forum, Thermec, vols. 638-642, pp. 1275-1280, 2010.

Aguilar et al., "Investment Casting Technology for Production of TiAl Low Pressure Turbine Blades—Process Engineering and Parameter Analysis", Intermetallics, 3rd IRC international workshop, vol. 19, Issue 6, pp. 757-761, Jun. 2011.

(Continued)

*Primary Examiner* — Anthony J Green
(74) *Attorney, Agent, or Firm* — Scott J. Asmus (57) ABSTRACT

The disclosure relates generally to mold compositions comprising calcium aluminate and calcium titanate. The disclosure also relates to methods of molding and the articles so molded using the mold compositions. More specifically, the disclosure relates to calcium aluminate/calcium titanate mold compositions and methods for casting titanium-containing articles, and the titanium-containing articles so molded.

32 Claims, 4 Drawing Sheets

(56) References Cited

U.S. PATENT DOCUMENTS

| | | |
|---|---|---|
| 5,366,570 A | 11/1994 | Mazur et al. |
| 5,368,657 A | 11/1994 | Anderson et al. |
| 5,372,663 A | 12/1994 | Shibue et al. |
| 5,407,001 A | 4/1995 | Yasrebi et al. |
| 5,424,027 A | 6/1995 | Eylon |
| 5,427,173 A | 6/1995 | Das et al. |
| 5,429,778 A | 7/1995 | Patel et al. |
| 5,443,892 A | 8/1995 | Holcombe et al. |
| 5,453,243 A | 9/1995 | Hansen et al. |
| 5,476,679 A | 12/1995 | Lewis et al. |
| 5,503,798 A | 4/1996 | Singheiser et al. |
| 5,580,403 A | 12/1996 | Mazur et al. |
| 5,602,197 A | 2/1997 | Johnson et al. |
| 5,626,179 A | 5/1997 | Choudhury et al. |
| 5,678,298 A | 10/1997 | Colvin et al. |
| 5,749,937 A | 5/1998 | Detering et al. |
| 5,766,329 A | 6/1998 | LaSalle et al. |
| 5,776,617 A | 7/1998 | Brady et al. |
| 5,823,243 A | 10/1998 | Kelly |
| 5,839,504 A | 11/1998 | Matsuda |
| 5,908,516 A | 6/1999 | Nguyen-Dinh |
| 5,942,057 A | 8/1999 | Hanamura et al. |
| 5,944,088 A | 8/1999 | Feagin |
| 5,950,706 A | 9/1999 | Choudhury et al. |
| 5,981,083 A | 11/1999 | Colvin et al. |
| 5,997,802 A | 12/1999 | Holcombe, Jr. et al. |
| 6,136,094 A | 10/2000 | Yamaji et al. |
| 6,174,387 B1 | 1/2001 | Bellows et al. |
| 6,174,495 B1 | 1/2001 | Nishikiori |
| 6,250,366 B1 | 6/2001 | Choudhury et al. |
| 6,283,195 B1 | 9/2001 | Chandley et al. |
| 6,284,389 B1 | 9/2001 | Jones et al. |
| 6,352,101 B1 | 3/2002 | Ghosh et al. |
| 6,355,362 B1 | 3/2002 | Jones et al. |
| 6,408,929 B2 | 6/2002 | Choudhury et al. |
| 6,409,963 B1 | 6/2002 | Gohres et al. |
| 6,425,504 B1 | 7/2002 | Besser et al. |
| 6,443,212 B1 | 9/2002 | Choudhury et al. |
| 6,481,490 B1 | 11/2002 | Vihtelic et al. |
| 6,488,073 B1 | 12/2002 | Blenkinsop et al. |
| 6,524,407 B1 | 2/2003 | Paul et al. |
| 6,596,963 B2 | 7/2003 | Kelly |
| 6,637,497 B2 | 10/2003 | Herron |
| 6,660,109 B2 | 12/2003 | Hajaligol et al. |
| 6,669,791 B2 | 12/2003 | Tetsui et al. |
| 6,705,385 B2 | 3/2004 | Ray et al. |
| 6,723,279 B1 | 4/2004 | Withers et al. |
| 6,746,508 B1 | 6/2004 | Deevi et al. |
| 6,755,239 B2 | 6/2004 | Ray et al. |
| 6,776,214 B2 | 8/2004 | Ray et al. |
| 6,799,626 B2 | 10/2004 | Ray et al. |
| 6,799,627 B2 | 10/2004 | Ray et al. |
| 6,868,814 B2 | 3/2005 | Baur et al. |
| 6,923,934 B2 | 8/2005 | Nishikiori |
| 7,157,148 B2 | 1/2007 | Takai et al. |
| 7,360,579 B2 | 4/2008 | Renkel et al. |
| 7,389,808 B2 | 6/2008 | Renkel et al. |
| 7,389,809 B2 | 6/2008 | Renkel et al. |
| 7,761,969 B2 | 7/2010 | Bewlay et al. |
| 8,062,581 B2 | 11/2011 | Bewlay et al. |
| 8,075,713 B2 | 12/2011 | Renkel |
| 8,136,572 B2 | 3/2012 | Renkel |
| 8,136,573 B2 | 3/2012 | Renkel |
| 8,167,023 B2 | 5/2012 | Renkel |
| 8,579,013 B2 | 11/2013 | Bewlay et al. |
| 2002/0108679 A1 | 8/2002 | Chandley et al. |
| 2003/0051780 A1 | 3/2003 | Blenkinsop et al. |
| 2004/0045644 A1 | 3/2004 | Guther et al. |
| 2005/0084407 A1 | 4/2005 | Myrick |
| 2007/0107202 A1 | 5/2007 | Das |
| 2007/0199676 A1 | 8/2007 | Wolter |
| 2007/0280328 A1 | 12/2007 | Lee et al. |
| 2008/0003453 A1 | 1/2008 | Ogren |
| 2008/0156147 A1 | 7/2008 | Kelly et al. |
| 2008/0156453 A1 | 7/2008 | Kelly et al. |
| 2008/0260608 A1 | 10/2008 | Rancoule |
| 2008/0290568 A1 | 11/2008 | Bewlay et al. |
| 2009/0050284 A1 | 2/2009 | Seserko |
| 2009/0133850 A1 | 5/2009 | Kelly et al. |
| 2009/0169415 A1 | 7/2009 | Chikugo et al. |
| 2009/0321038 A1 | 12/2009 | Renkel |
| 2010/0089500 A1 | 4/2010 | Renkel |
| 2011/0091324 A1 | 4/2011 | Holzschuh |
| 2011/0094705 A1 | 4/2011 | Kelly et al. |
| 2013/0084190 A1 | 4/2013 | Bewlay et al. |
| 2013/0108459 A1 | 5/2013 | Bewlay et al. |
| 2013/0210320 A1 | 8/2013 | Bewlay et al. |
| 2013/0224066 A1 | 8/2013 | Bewlay et al. |
| 2013/0248061 A1 | 9/2013 | Kelly et al. |
| 2013/0251537 A1 | 9/2013 | Weimer et al. |

FOREIGN PATENT DOCUMENTS

| | | |
|---|---|---|
| DE | 19752777 A1 | 7/1999 |
| DE | 10125129 A1 | 1/2003 |
| DE | 102009027019 A1 | 11/2010 |
| EP | 0096985 A1 | 12/1983 |
| EP | 0238758 A2 | 9/1987 |
| EP | 0529594 A1 | 3/1993 |
| EP | 0530968 A1 | 3/1993 |
| EP | 0560070 A1 | 9/1993 |
| EP | 0753593 A1 | 1/1997 |
| EP | 1061149 A1 | 12/2000 |
| EP | 1797977 A2 | 6/2007 |
| GB | 569852 | 6/1945 |
| GB | 783411 A | 9/1957 |
| GB | 2248071 A | 3/1992 |
| GB | 2440334 A | 1/2008 |
| JP | 54157780 | 12/1979 |
| JP | 01139988 A | 6/1989 |
| JP | 01184392 A | 7/1989 |
| JP | 03282187 A | 12/1991 |
| JP | 0499840 A | 3/1992 |
| JP | 06009290 | 1/1994 |
| JP | 06179930 | 6/1994 |
| JP | 06269927 A | 9/1994 |
| JP | 0789789 A | 4/1995 |
| JP | 10204555 A | 8/1998 |
| JP | 11116399 A | 4/1999 |
| JP | 2001208481 A | 8/2001 |
| JP | 2003056988 A | 2/2003 |
| WO | WO8606366 A1 | 11/1986 |
| WO | WO8803520 A1 | 5/1988 |
| WO | WO8910982 A1 | 11/1989 |
| WO | WO9013377 A1 | 11/1990 |
| WO | WO9630552 A1 | 10/1996 |
| WO | WO9832557 A1 | 7/1998 |
| WO | WO9927146 A1 | 6/1999 |
| WO | WO0044959 A1 | 8/2000 |
| WO | WO0067541 A1 | 11/2000 |
| WO | WO2008049452 A1 | 5/2008 |
| WO | WO2011048423 A1 | 4/2011 |

OTHER PUBLICATIONS

U.S. Appl. No. 13/559,656, filed Jul. 27, 2012, titled Crucible and Facecoat Compositions and Methods for Melting Titanium and Titanium Aluminide Alloys.

U.S. Appl. No. 13/891,624, filed May 10, 2013, titled Systems and Methods for Nondestructive Evaluation of Molds and Crucibles Used in Investment Casting.

U.S. Appl. No. 13/752,880, filed Jan. 29, 2013, titled Calcium Hexaluminate-Containing Mold and Facecoat Compositions and Methods for Casting Titanium and Titanium Aluminide Alloys.

U.S. Appl. No. 13/693,155, filed Dec. 4, 2012, titled Crucible and Extrinsic Facecoat Compositions and Methods for Melting Titanium and Titanium Aluminide Alloys.

| | |
|---|---|
| COMBINING CALCIUM ALUMINATE AND CALCIUM TITANATE WITH A LIQUID TO PRODUCE A SLURRY OF CALCIUM ALUMINATE AND CALCIUM TITANATE | ~705 |
| INTRODUCING THE SLURRY INTO A MOLD CAVITY THAT CONTAINS A FUGITIVE PATTERN | ~710 |
| ALLOWING THE SLURRY TO CURE IN THE MOLD CAVITY TO FORM A MOLD FOR CASTING A TITANIUM-CONTAINING ARTICLE | ~715 |

| | |
|---|---|
| OBTAINING AN INVESTMENT CASTING MOLD COMPOSITION COMPRISING CALCIUM ALUMINATE, CALCIUM TITANATE, AND ALUMINUM OXIDE | ~725 |
| POURING THE INVESTMENT CASTING MOLD COMPOSITION INTO A VESSEL CONTAINING A FUGITIVE PATTERN | ~730 |
| CURING THE INVESTMENT CASTING MOLD COMPOSITION | ~735 |
| REMOVING THE FUGITIVE PATTERN FROM THE MOLD | ~740 |
| PREHEATING THE MOLD TO A MOLD CASTING TEMPERATURE | ~745 |
| POURING MOLTEN TITANIUM OR TITANIUM ALLOY INTO THE HEATED MOLD | ~750 |
| SOLIDIFYING THE MOLTEN TITANIUM OR TITANIUM ALLOY AND FORMING A SOLIDIFIED TITANIUM OR TITANIUM ALLOY CASTING | ~755 |
| REMOVING THE SOLIDIFIED TITANIUM OR TITANIUM ALLOY CASTING FROM THE MOLD | ~760 |

CALCIUM TITANATE CONTAINING MOLD COMPOSITIONS AND METHODS FOR CASTING TITANIUM AND TITANIUM ALUMINIDE ALLOYS

BACKGROUND

Modern gas or combustion turbines must satisfy the highest demands with respect to reliability, weight, power, economy, and operating service life. In the development of such turbines, the material selection, the search for new suitable materials, as well as the search for new production methods, among other things, play an important role in meeting standards and satisfying the demand.

The materials used for gas turbines may include titanium alloys, nickel alloys (also called super alloys) and high strength steels. For aircraft engines, titanium alloys are generally used for compressor parts, nickel alloys are suitable for the hot parts of the aircraft engine, and the high strength steels are used, for example, for compressor housings and turbine housings. The highly loaded or stressed gas turbine components, such as components for a compressor for example, are typically forged parts. Components for a turbine, on the other hand, are typically embodied as investment cast parts.

Although investment casting is not a new process, the investment casting market continues to grow as the demand for more intricate and complicated parts increase. Because of the great demand for high quality, precision castings, there continuously remains a need to develop new ways to make investment castings more quickly, efficiently, cheaply and of higher quality.

Conventional investment mold compounds that consist of fused silica, cristobalite, gypsum, or the like, that are used in casting jewelry and dental prostheses industries are generally not suitable for casting reactive alloys, such as titanium alloys. One reason is because there is a reaction between mold titanium and the investment mold.

There is a need for a simple investment mold that does not react significantly with titanium and titanium aluminide alloys. Approaches have been adopted previously with ceramic shell molds for titanium alloy castings. In the prior examples, in order to reduce the limitations of the conventional investment mold compounds, several additional mold materials have been developed. For example, an investment compound was developed of an oxidation-expansion type in which magnesium oxide or zirconia was used as a main component and metallic zirconium was added to the main constituent to compensate for the shrinkage due to solidification of the cast metal. There is thus also a need for simple and reliable investment casting methods which allow easy extraction of near-net-shape metal or metal alloys from an investment mold that does not react significantly with the metal or metal alloy.

SUMMARY

Aspects of the present disclosure provide casting mold compositions, methods of casting, and cast articles that overcome the limitations of the conventional techniques. Though some aspect of the disclosure may be directed toward the fabrication of components for the aerospace industry, for example, engine turbine blades, aspects of the present disclosure may be employed in the fabrication of any component in any industry, in particular, those components containing titanium and/or titanium alloys.

One aspect of the present disclosure is a mold composition for casting a titanium-containing article, comprising: calcium titanate; and a calcium aluminate cement comprising calcium monoaluminate. In a particular embodiment, the calcium aluminate cement comprises calcium monoaluminate and calcium dialuminate. In another particular embodiment, the calcium aluminate cement comprises calcium monoaluminate and mayenite. In another particular embodiment, the calcium aluminate cement comprises calcium monoaluminate, calcium dialuminate, and mayenite.

The percentage of solids in an initial calcium aluminate-liquid cement mixture used to make the mold is, in one example, from about 60 to about 80%. In another example, the percentage of solids in the final calcium aluminate-liquid cement mixture with the calcium titanate and the large scale alumina, used to make the mold, is from about 65% to about 90%. The percentage of solids is defined as the total solids in the mix divided by the total mass of the liquid and solids in the mix, described as a percentage; the percentage of solids is also referred to as the solids loading.

In one embodiment, the calcium titanate in the mold composition comprises particles that are less than about 100 microns in outside dimension. In a particular embodiment, the calcium titanate comprises from about 15% by weight to about 50% by weight of the mold composition. In one embodiment, the mold composition further comprises hollow particles of aluminum oxide. Another aspect of the present disclosure is a titanium-containing article casting-mold composition comprising calcium aluminate. For instance, an aspect of the present disclosure may be uniquely suited to providing mold compositions to be used in molds for casting titanium-containing and/or titanium alloy-containing articles or components, for example, titanium containing turbine blades. In one aspect, the casting-mold composition may further comprise aluminum oxide, for example, aluminum oxide particles that are less than about 10,000 microns (i.e., 10 millimeters, m) in outside dimension. In another embodiment, the aluminum oxide comprises particles that may have outside dimensions that range from about 10 microns [μm] to about 10,000 microns (i.e., 10 mm).

In one embodiment, the aluminum oxide in the mold composition may comprise from about 0.5% by weight to about 80% by weight of the mold composition. In a particular embodiment, the aluminum oxide in the mold composition comprises from about 5% by weight to about 60% by weight of the mold composition. In another aspect, the aluminum oxide may comprise from about 15% by weight to about 30% by weight of the casting-mold composition. In another aspect, the aluminum oxide may comprise from about 40% by weight to about 60% by weight of the casting-mold composition. In another aspect, the aluminum oxide may comprise from about 40% by weight to about 68% by weight of the casting-mold composition. In yet another embodiment, the aluminum oxide is in the form of hollow particles comprising about 99% by weight of aluminum oxide and may have about 10000 microns or less in outside dimension.

In one embodiment, the calcium aluminate in the casting-mold composition may be provided in the form of a calcium aluminate cement, for example, as a calcium aluminate cement comprising calcium monoaluminate. In another embodiment, the calcium aluminate cement can comprise calcium monoaluminate and calcium dialuminate. In another embodiment, the calcium aluminate cement can comprise calcium monoaluminate and mayenite. In another embodiment, the calcium aluminate cement can comprise calcium monoaluminate, calcium dialuminate, and mayenite. In one aspect, the weight fraction of calcium monoaluminate is 0.05-0.95, the weight fraction of calcium dialuminate is 0.05-0.80, and the weight fraction of mayenite is 0.01-0.30. In one embodiment, the calcium monoaluminate comprises a weight fraction of about 0.1 to about 0.8; the calcium dialuminate comprises a weight fraction of about 0.1 to about 0.6; and the mayenite comprises a weight fraction of about 0.01 to about 0.2. In yet another embodiment, the weight fraction of calcium monoaluminate in the calcium aluminate cement is more than about 0.5, and the weight fraction of mayenite in the calcium aluminate cement is less than about 0.15. In one embodiment, the calcium aluminate cement has a particle size of about 50 microns or less. In another embodiment, the calcium aluminate cement is more than 30% by weight of the casting-mold composition.

In one embodiment, the casting-mold composition further comprises oxide particles, for example, aluminum oxide particles, magnesium oxide particles, calcium oxide particles, zirconium oxide particles, titanium oxide particles, and/or silicon oxide particles, or combinations thereof. In another embodiment, the oxide particles may be hollow oxide particles. In one embodiment, the hollow oxide particles may be hollow alumina (that is, aluminum oxide) spheres. In one embodiment, the casting-mold composition may further include calcium oxide.

According to one embodiment of the disclosure, the calcium oxide in the calcium aluminate cement may be greater than about 10% by weight and less than about 60% by weight of the casting-mold composition. For example, the calcium oxide may be greater than about 30% by weight and less than about 50% by weight of the final casting-mold composition, or the calcium oxide may be greater than about 25% by weight and less than about 35% by weight of the final casting-mold composition.

According to one embodiment of the disclosure, the titanium oxide in the molds may be greater than about 5% by weight and less than about 55% by weight of the casting-mold composition. For example, the titanium oxide may be greater than about 10% by weight and less than about 40% by weight of the casting-mold composition, or the titanium oxide may be greater than about 15% by weight and less than about 35% by weight of the casting-mold composition.

In one embodiment, the casting-mold composition further comprises silica. As provided herein, the silica can be incorporated into the casting-mold composition by mixing colloidal silica with the calcium aluminate cement.

In one embodiment, the casting-mold composition may be used in an investment casting-mold, for example, aspects of the disclosure may be used in investment casting-mold compositions for molds that provide "near-net-shape" components, for instance, near-net-shape, titanium-containing turbine blades, and the like. In one embodiment, an investment casting-mold composition is provided for casting near-net-shape titanium aluminide articles, for example, near-net-shape titanium aluminide turbine blades.

One aspect of the present disclosure is a method for forming a casting mold for casting a titanium-containing article. This method may typically comprise: combining calcium aluminate and calcium titanate with a liquid, for example, water, to produce a slurry of calcium aluminate and calcium titanate in the liquid; introducing the slurry into a mold cavity that contains a fugitive pattern; and allowing the slurry to cure in the mold cavity to form a mold, for example, a mold for casting a titanium-containing article. In one embodiment, the method may further include, before introducing the slurry into the mold cavity, introducing oxide particles to the slurry. In another embodiment, the method may further include mixing silica (e.g., colloidal silica and/or particulate silica) with the calcium aluminate prior to combining the calcium aluminate with the calcium titanate or at substantially the same time of combining the calcium aluminate with the calcium titanate. The mold formed may be a green mold, that is, an uncured mold, and the method may further comprise firing the green mold. The calcia and titania can be added as calcium titanate, or a combination of separate particles of calcia and titania; these would be fine-scale particles of a size less than 50 microns. If the calcium titanate is added as a combination of separate particles of calcia and titania, the particles can be reacted during the mold firing cycle to produce calcium titanate. In one embodiment, the calcium titanate is added as pre-formulated calcium titanate, rather than as calcia and titania.

In another embodiment, the casting mold formed may be an investment casting mold, for example, for investment casting a titanium-containing article. In one embodiment, the titanium-containing article comprises a titanium aluminide article, for example, a near-net-shape titanium aluminide article, for instance, a near-net-shape titanium aluminide turbine blade.

In addition, one aspect of the present disclosure is a mold formed from the casting-mold composition recited herein. That is, in one embodiment, the disclosure is directed to a mold formed from casting-mold composition comprising calcium aluminate cement. Another aspect of the present disclosure is directed to a titanium-containing article formed in the aforementioned mold.

In yet a further embodiment, the article comprises a metallic article, for example, a titanium-containing metallic article. In one aspect, the article comprises a titanium aluminide turbine blade. In yet another embodiment, the article comprises a near-net-shape, titanium aluminide turbine blade requiring little or no material removal prior to installation.

One aspect of the present disclosure is directed to a casting method for titanium and titanium alloys comprising: obtaining an investment casting-mold composition comprising calcium aluminate, calcium titanate, and aluminum oxide; pouring said investment casting-mold composition into a vessel containing a fugitive pattern; curing said investment casting-mold composition; removing said fugitive pattern from the mold; preheating the mold to a mold casting temperature; pouring molten titanium or titanium alloy into the heated mold; solidifying the molten titanium or titanium alloy and forming a solidified titanium or titanium alloy casting; and removing the solidified titanium or titanium alloy casting from the mold.

In one embodiment, between removing said fugitive pattern from the mold and preheating the mold to a mold casting temperature, the mold may first be heated to a temperature of about 450 degrees Celsius to about 1200 degrees Celsius, and then either cooled to room temperature or maintained at a casting temperature of about 450 degrees Celsius to about 850 degrees Celsius. In one embodiment, the curing step is conducted at temperatures below about 30 degrees Celsius for between one hour to forty-eight hours. In another embodiment, the removing of the fugitive pattern comprises melting, dissolution, ignition, oven dewaxing, furnace dewaxing, steam autoclave dewaxing, or microwave dewaxing. In one embodiment, after the solidified casting is removed from the mold, the casting may be inspected by x-ray and/or neutron radiography.

One aspect of the present disclosure is directed to a titanium or titanium alloy article made by the casting method as recited herein. That is, in one embodiment, the disclosure is directed to a titanium or titanium alloy article made by the casting method comprising: obtaining an investment casting mold composition comprising calcium aluminate, calcium titanate, and aluminum oxide; pouring the investment casting mold composition into a vessel containing a fugitive pattern; curing the investment casting mold composition; removing the fugitive pattern from the mold; preheating the mold to a mold casting temperature; pouring molten titanium or titanium alloy into the heated mold; solidifying the molten titanium or titanium alloy; and removing a solidified titanium or titanium alloy from the mold.

One aspect of the present disclosure is directed to a turbine blade comprising titanium or titanium alloy and having an average roughness, Ra, of less than about 20 microinches across at least a portion of its surface area.

These and other aspects, features, and advantages of this disclosure will become apparent from the following detailed description of the various aspects of the disclosure taken in conjunction with the accompanying drawings.

BRIEF DESCRIPTION OF THE FIGURES

The subject matter, which is regarded as the invention, is particularly pointed out and distinctly claimed in the claims at the conclusion of the specification. The foregoing and other features and advantages of the disclosure will be readily understood from the following detailed description of aspects of the invention taken in conjunction with the accompanying drawings in which:

FIG. 1 also shows various calcium oxide-aluminum oxide composition ranges for the initial calcium aluminate cement, and in particular shows aluminum oxide percentages and temperature ranges for the compositions according to disclosed embodiments of the initial cement. FIG. 1 is an equilibrium phase diagram and provides a means for considering the phases present in a non-equilibrium calcium aluminate cement as used for making molds as practiced in the present disclosure.

FIGS. 2A-2B show the composition ranges for alumina, calcia, and titania as used for the molds in one embodiment. These bulk composition ranges show the bulk compositions that were used that provided the phases such as calcium aluminate, calcium titanate, and alumina that comprise the mold.

DETAILED DESCRIPTION

The present disclosure relates generally to mold compositions and methods of mold making and articles cast from the molds, and, more specifically, to mold compositions and methods for casting titanium-containing articles, and titanium-containing articles so molded.

The manufacture of titanium based components by investment casting of titanium and its alloys in investment shell molds poses problems from the standpoint that the castings should be cast to "near-net-shape." That is, the components may be cast to substantially the final desired dimensions of the component, and require little or no final treatment or machining.

The present disclosure provides a new approach for casting near-net-shape titanium and titanium aluminide components, such as, turbine blades or airfoils. Embodiments of the present disclosure provide compositions of matter for investment casting molds and casting methods that provide improved titanium and titanium alloy components for example, for use in the aerospace, energy, industrial and marine industry. In some aspects, the mold composition provides a mold that contains phases that provide improved mold strength during mold making and/or increased resistance to reaction with the casting metal during casting. The molds according to aspects of the disclosure are capable of casting at high pressure, which is desirable for near-net-shape casting methods. Mold compositions, for example, containing calcium aluminate cement and calcium titanate, or further comprising alumina particles, and certain constituent phases, have been identified that provide castings with improved properties.

One aspect of the present disclosure is directed to a mold composition for casting a titanium-containing article, comprising calcium aluminate and calcium titanate. The mold composition in one example further comprises hollow alumina particles. The article cast using the mold composition comprises a metallic based article. In one embodiment, the article comprises a titanium aluminide-containing article. In another embodiment, the article comprises a titanium aluminide turbine blade. In yet another embodiment, the article comprises a near-net-shape, titanium aluminide turbine blade.

In a particular embodiment, the calcium aluminate cement comprises calcium monoaluminate. In another particular embodiment, the calcium aluminate cement comprises calcium monoaluminate and calcium dialuminate. In another particular embodiment, the calcium aluminate cement comprises calcium monoaluminate and mayenite. In another particular embodiment, the calcium aluminate cement comprises calcium monoaluminate, calcium dialuminate, and mayenite.

In one aspect, the constituent phases of the calcium aluminate cement aspect of the mold comprise calcium monoaluminate. The present inventors found that in certain embodiments calcium monoaluminate was desirable for at least two reasons. First, calcium monoaluminate is believed to promote hydraulic bond formation between the cement particles during the initial stages of mold making, and this hydraulic bonding is believed to provide mold strength during mold construction. Second, calcium monoaluminate experiences a very low rate of reaction with titanium and titanium aluminide based alloys. In a certain embodiment, calcium monoaluminate is provided to the mold composition of the present disclosure, for example, the investment molds, in the form of calcium aluminate cement. In one aspect, the mold composition comprises a mixture of calcium aluminate cement and calcium titanate. In another aspect, the mold composition comprises a mixture of calcium aluminate cement, calcium titanate, and alumina, that is, aluminum oxide. In another aspect, the mold composition comprises a mixture of calcium aluminate cement, fine-scale (less than 50 micron) calcium titanate, and large-scale (greater than 50 micron) alumina, that is, aluminum oxide. In another aspect, the mold composition comprises a mixture of calcium aluminate cement, fine-scale (less than 50 micron) calcium oxide, fine-scale (less than 50 micron) titanium oxide, and large-scale (greater than 50 micron) alumina, that is, aluminum oxide. As noted herein above, in particular embodiments, the calcium aluminate cement can comprise (i) calcium monoaluminate; (ii) calcium monoaluminate and calcium dialuminate; (iii) calcium monoaluminate and mayenite; or (iv) calcium monoaluminate, calcium dialuminate, and mayenite.

In one aspect of the disclosure, the mold composition provides low or minimum reaction with the alloy during casting, and the mold provides castings with the required component properties. External properties of the casting include features such as shape, geometry, and surface finish. Internal properties of the casting include mechanical properties, microstructure, defects (such as pores and inclusions) below a specified size and within allowable limits.

The mold composition of one aspect of the present disclosure provides for low-cost casting of titanium alumnide (TiAl) turbine blades, for example, TiAl low pressure turbine blades. The mold composition may provide the ability to cast near-net-shape parts that require less machining and/or treatment than parts made using conventional shell molds and gravity casting. As used herein, the expression "near-net-shape" implies that the initial production of an article is close to the final (net) shape of the article, reducing the need for further treatment, such as, extensive machining and surface finishing. As used herein, the term "turbine blade" refers to both steam turbine blades and gas turbine blades.

Accordingly, the present disclosure addresses the challenges of producing a mold, for example, an investment mold, that does not react significantly with titanium and titanium aluminide alloys. In addition, according to some aspects of the disclosure, the strength and stability of the mold allow high pressure casting approaches, such as centrifugal casting. One of the technical advantages of this disclosure is that, in one aspect, the techniques improve the structural integrity of net shape casting that can be generated, for example, from calcium aluminate cement and calcium titanate investment molds or from calcium aluminate cement, calcium titanate, and alumina investment molds. The higher strength, for example, higher fatigue strength, allows lighter components to be fabricated. In addition, components having higher fatigue strength can last longer, and thus have lower life-cycle costs.

Casting Mold Composition

Aspects of the present disclosure provide a composition of matter for investment casting molds that can provide improved components of titanium and titanium alloys. The mold chemical composition includes calcium titanate and a calcium aluminate cement. In a more particular embodiment, the mold chemical composition includes calcium titanate, a calcium aluminate cement, and alumina. The ranges of the weight fractions of the phases in the fired mold of the present disclosure can be, without limitation, 5-50 weight percent calcium titanate, more than 20 weight percent of calcium aluminate cement (e.g., 15-30 weight percent calcium monoaluminate and 15-30 weight percent calcium dialuminate), and 5-70 weight percent alumina, or more particularly 15-30 weight percent alumina.

Figure 2A:
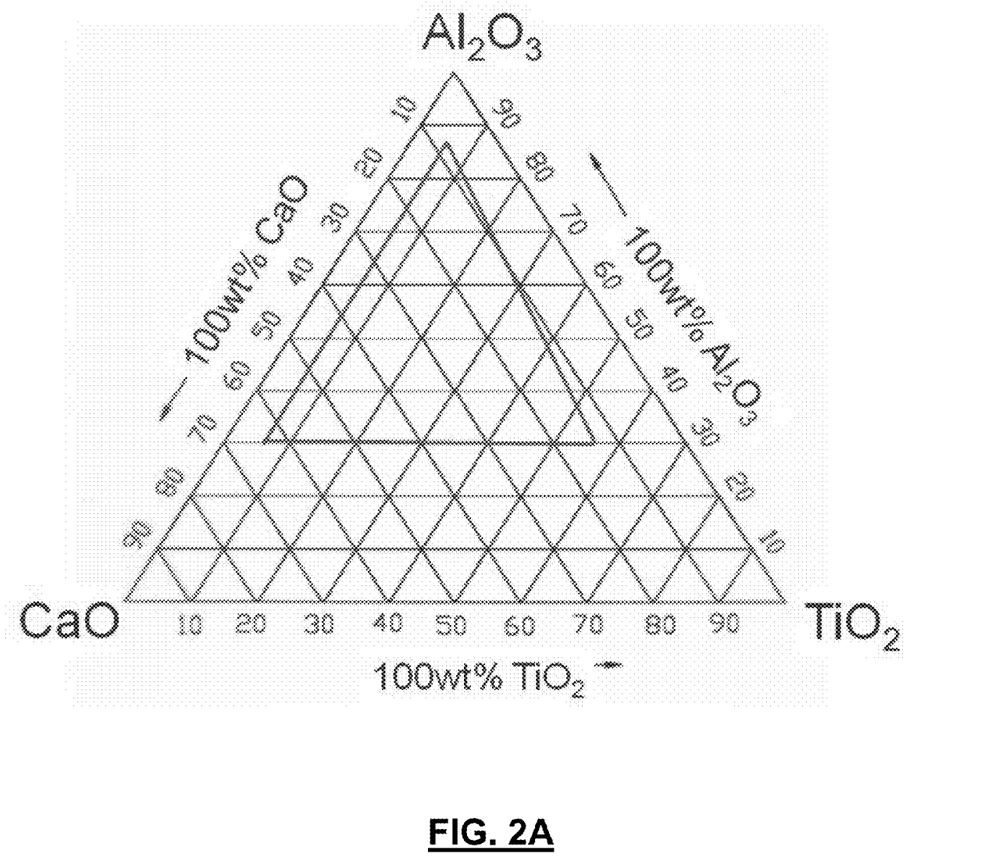
FIG. 2A shows the bulk ternary composition space in weight percent for the ranges of alumina, calcia, and titania for the mold compositions that are in one embodiment.
Figure 2B:
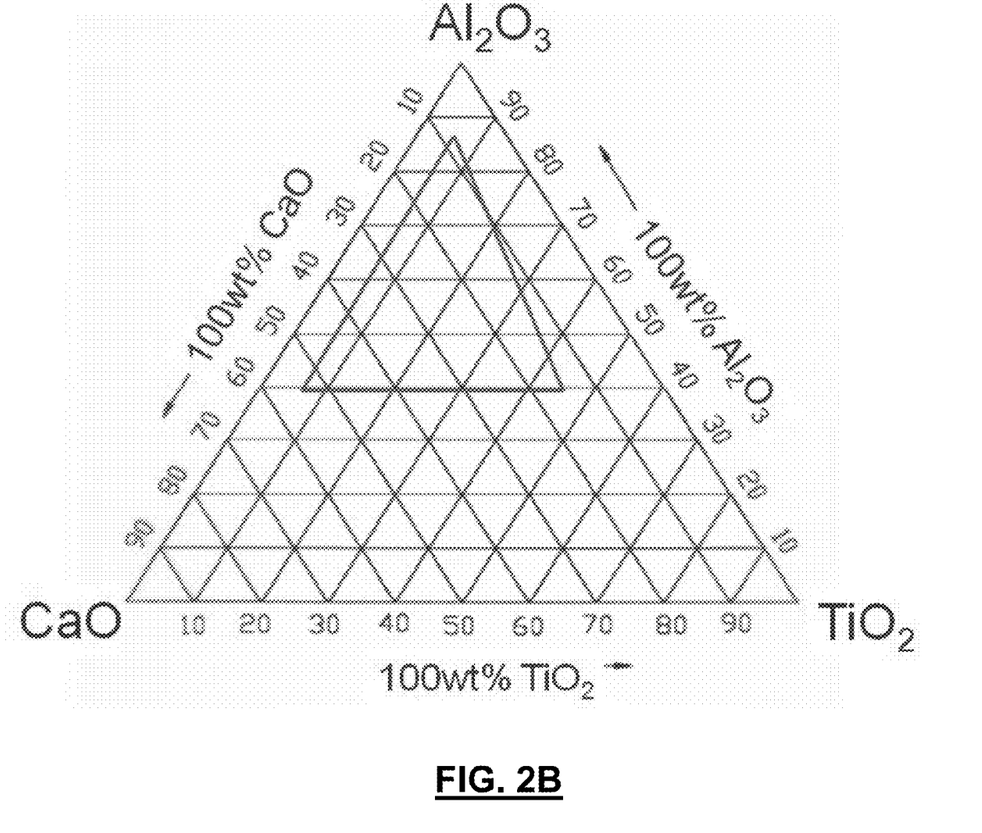
FIG. 2B shows the bulk ternary composition space for the ranges of alumina, calcia, and titania for the mold compositions that are in a further embodiment.

In one aspect of the present disclosure, the bulk ternary composition space for the ranges of alumina, calcia, and titania for the mold compositions in certain embodiments are shown in FIGS. 2A and 2B. FIG. 2A shows one embodiment of mold composition ranges for alumina, calcia, and titania, as follows: alumina at 15-70 weight percent, calcia at 5-60 weight percent, and titania at 5-55 weight percent. FIG. 2B shows another embodiment of mold composition ranges from alumina, calcia, and titania, as follows: alumina at 15-55 weight percent, calcia at 5-60 weight percent, and titania at 5-45 weight percent.

In one aspect of the present disclosure, the calcium titanate is provided in the form of $CaTiO_3$. In a particular embodiment, the calcium powder used to make the mold of the present technique comprises 98 percent by weight $CaTiO_3$ and 2 percent weight percent $TiO_2$. The calcium titanate particles can be incorporated as particles with a size of less than 100 microns in outside dimension. In a particular embodiment, the calcium titanate powder used for making the mold of the present disclosure can have a maximum particle size of about 50 microns in outside dimension. In a more particular embodiment, the calcium titanate powder used for making the mold of the present disclosure can have a maximum particle size of about 43 microns in outside dimension. The calcium titanate can be produced by firing/sintering lime (CaO) and rutile ($TiO_2$). In another aspect, in terms of the final mold composition, a sufficient amount of CaO and $TiO_2$ is used in order to minimize reaction with the titanium alloy. The calcia and titania can be added as calcium titanate, or as a combination of separate particles of calcia and titania; these would be fine-scale particles of a size less than 50 microns. If the calcium titanate is added as a combination of separate particles of calcia and titania, the particles can be reacted during the mold firing cycle to produce calcium titanate. In one embodiment, the calcium titanate is added as pre-formulated calcium titanate, rather than as calcia and titania.

In one aspect of the present disclosure, calcium monoaluminate can be provided in the form of calcium aluminate cement. Calcium aluminate cement may be referred to as a "cement" or "binder." In certain embodiments, calcium aluminate cement is mixed with alumina particulates to provide a castable investment mold mix. The calcium aluminate cement in one example is greater than about 20% by weight in the castable mold mix. In certain embodiments, the calcium aluminate cement is between about 30% and about 60% by weight in the castable mold mix. The use of greater than 30% by weight of calcium aluminate cement in the castable mold mix (casting mold composition) is a feature of the present disclosure. The selection of the appropriate calcium aluminate cement chemistry and the weight fractions of calcium titanate particles and alumina particles in the formulation are factors in the performance of the mold. In one aspect, a sufficient amount of calcium oxide may be provided in the mold composition in order to minimize reaction with the titanium alloy. In one aspect, the mold composition, for example, the investment mold composition, may comprise a multi-phase mixture of calcium aluminate cement, calcium titanate particles, and alumina particles. The calcium aluminate cement may function as a binder, for example, the calcium aluminate cement binder may provide the main skeletal structure of the mold structure. The calcium aluminate cement may comprise a continuous phase in the mold and provide strength during curing, and casting. The mold composition may comprise calcium aluminate cement, calcium titanate, and alumina, that is, calcium aluminate cement, calcium titanate, and alumina may comprise substantially the only components of the mold composition, with little or no other components. In one embodiment, the present disclosure comprises a titanium-containing article casting-mold composition comprising calcium aluminate. In another embodiment, the casting-mold composition further comprises oxide particles, for example, hollow oxide particles. According to aspects of the disclosure, the oxide particles may be aluminum oxide particles, magnesium oxide particles, calcium oxide particles, zirconium oxide particles, titanium oxide particles, silicon oxide particles, combinations thereof, or compositions thereof.

The casting-mold composition can further include aluminum oxide, for example, in the form of hollow particles, that is, particles having a hollow core or a substantially hollow core substantially surrounded by an oxide. These hollow aluminum oxide particles may comprise about 99% of aluminum oxide and have about 10 millimeter [mm] or less in outside dimension, such as, width or diameter. In one embodiment, the hollow aluminum oxide particles have about 1 millimeter [mm] or less in outside dimension, such as, width or diameter. In certain embodiments, the hollow oxide particles may comprise hollow alumina spheres. The hollow alumina spheres may be incorporated into the casting-mold composition, and the hollow spheres may have a range of geometries, such as, round particles, or irregular aggregates. In certain embodiments, the alumina may include both round particles and hollow spheres. In one aspect, these geometries were found to increase the fluidity of the investment mold mixture. The enhanced fluidity may typically improve the surface finish and fidelity or accuracy of the surface features of the final casting produced from the mold.

The aluminum oxide comprises particles ranging in outside dimension from about 10 microns to about 10,000 microns. In certain embodiments, the aluminum oxide comprises particles that are less than about 500 microns in outside dimension, for example, diameter or width. The aluminum oxide may comprise from about 0.5% by weight to about 80% by weight of the casting-mold composition, or more particularly from about 5% by weight to about 60% by weight of the casting-mold composition. Alternatively, the aluminum oxide comprises from about 15% by weight to about 30% by weight of the casting-mold composition. Alternatively, the aluminum oxide comprises from about 40% by weight to about 60% by weight of the casting-mold composition. Alternatively, the aluminum oxide comprises from about 40% by weight to about 68% by weight of the casting-mold composition.

According to one embodiment of the disclosure, the calcium oxide in the final mold composition may be greater than about 10% by weight and less than about 60% by weight of the casting-mold composition. For example, the calcium oxide may be greater than about 30% by weight and less than about 50% by weight of the final casting-mold composition, or the calcium oxide may be greater than about 25% by weight and less than about 35% by weight of the final casting-mold composition.

According to one embodiment of the disclosure, the titanium oxide in the final mold composition may be greater than about 5% by weight and less than about 55% by weight of the casting-mold composition. For example, the titanium oxide in the final mold composition may be greater than about 10% by weight and less than about 40% by weight of the casting-mold composition, or the titanium oxide may be greater than about 15% by weight and less than about 35% by weight of the final casting-mold composition.

In a specific embodiment, the casting-mold composition of the present disclosure comprises a calcium aluminate cement. The calcium aluminate cement can include calcium monoaluminate. Alternatively, the calcium aluminate cement can include calcium monoaluminate and calcium dialuminate. Alternatively, the calcium aluminate cement includes at least three phases or components comprising calcium and aluminum: calcium monoaluminate, calcium dialuminate, and mayenite. The weight fraction of calcium monoaluminate may range from 0.05 to 0.95; the weight fraction of calcium dialuminate may range from 0.05 to 0.80; and the weight fraction of mayenite may range from 0.01 to 0.30. In another example, the weight fraction of calcium monoaluminate comprises a weight fraction of about 0.1 to about 0.8; the calcium dialuminate comprises a weight fraction of about 0.1 to about 0.6; and the mayenite comprises a weight fraction of about 0.01 to about 0.2. The weight fraction of calcium monoaluminate in the calcium aluminate cement may be more than about 0.5, and the weight fraction of mayenite in the calcium aluminate cement may be less than about 0.15. In another embodiment, the calcium aluminate cement is more than 30% by weight of the casting-mold composition.

In one embodiment, the calcium aluminate cement has a particle size of about 50 microns or less. A particle size of less than 50 microns is useful in certain applications for three reasons: first, the fine particle size is believed to promote the formation of hydraulic bonds during mold mixing and curing; second, the fine particle size is understood to promote interparticle sintering during firing, and this can increase the mold strength; and third, the fine particle size is believed to improve the surface finish of the cast article produced in the mold. The calcium aluminate cement may be provided as powder, and can be used either in its intrinsic powder form, or in an agglomerated form, such as, as spray dried agglomerates. The calcium aluminate cement can also be preblended with fine-scale (for, example, less than 10 micron in size) alumina. The fine-scale alumina is believed to provide an increase in strength due to sintering during high-temperature firing. In certain instances, larger-scale alumina (that is, greater than 10 micron in size) may also be added with or without the fine-scale alumina. Similarly, the calcium titanate particulate can typically have a particle size of less than 50 microns; at this size it can be intimately mixed with the calcium aluminate cement particles. More generally, the calcium titanate particles can have a size of less than 100 microns and provide improved surface finish of the mold and the subsequent cast component.

The hollow alumina particles serve at least two functions: [1] they reduce the density and the weight of the mold, with minimal reduction in strength; strength levels of approximately 500 psi and above are obtained, with densities of approximately 2 g/cc and less; and [2] they reduce the elastic modulus of the mold and help to provide compliance during cool down of the mold and the component after casting. The increased compliance and crushability of the mold may reduce the tensile stresses on the component.

Calcium Aluminate Cement Composition

The calcium aluminate cement used in aspects of the disclosure typically comprises three phases or components of calcium and aluminum: calcium monoaluminate, calcium dialuminate, and mayenite. Calcium mono-aluminate is a hydraulic mineral present in calcium alumina cement. Calcium monoaluminate's hydration contributes to the high early strength of the investment mold. Mayenite is desirable in the cement because it provides strength during the early stages of mold curing due to the fast formation of hydraulic bonds. The mayenite is, however, typically reduced during heat treatment of the mold prior to casting.

In one aspect, the initial calcium aluminate cement formulation is typically not at thermodynamic equilibrium after firing in the cement manufacturing kiln. In one embodiment, the weight fraction of calcium monoaluminate in the cement is greater than 0.5, and the weight fraction of mayenite is less than 0.15. The mayenite is incorporated in the mold because it is a fast setting calcium aluminate and it is believed to provide the mold with strength during the early stages of curing. Curing may be performed at low temperatures, for example, temperatures between 15 degrees Celsius and 40 degrees Celsius because the fugitive wax pattern is temperature sensitive and loses its shape and properties on thermal exposure above about 35 degrees C. In one example the mold is cured at temperatures below 30 degrees C.

The calcium aluminate cement may typically be produced by mixing high purity alumina with high purity calcium oxide or calcium carbonate; the mixture of compounds is typically heated to a high temperature, for example, temperatures between 1000 and 1500 degrees C. in a furnace or kiln and allowed to react.

The resulting product, known in the art as cement "clinker," that is produced in the kiln is then crushed, ground, and sieved to produce a calcium aluminate cement of the desired particle size. Further, the calcium aluminate cement is designed and processed to have a minimum quantity of impurities, such as, minimum amounts of silica, sodium and other alkali, and iron oxide. In one aspect, the target level for the calcium aluminate cement is that the sum of the $Na_2O$, $SiO_2$, $Fe_2O_3$, and $TiO_2$ is less than about 2 weight percent. In one embodiment, the sum of the $Na_2O$, $SiO_2$, $Fe_2O_3$, and $TiO_2$ is less than about 0.05 weight percent.

In one aspect of the disclosure, a calcium aluminate cement with bulk alumina concentrations over 35% weight in alumina ($Al_2O_3$) and less than 50% weight calcium oxide is provided. The maximum alumina concentration of the cement may be about 85% (for example, about 15% CaO). In one embodiment, the calcium aluminate cement is of high purity and contains up to 70% alumina. The weight fraction of calcium monoaluminate may be maximized in the fired mold prior to casting. A minimum amount of calcium oxide may be required to minimize reaction between the casting alloy and the mold. If there is more than 50% calcium oxide in the cement, this can lead to phases such as mayenite and tricalcium aluminate, and these do not perform as well as the calcium monoaluminate during casting. In one example the range for calcium oxide in the calcium aluminate cement is less than about 50% and greater than about 15% by weight or more particularly by 20% by weight. As noted above, the three phases in the calcium aluminate cement/binder in the mold are calcium monoaluminate, calcium dialuminate, and mayenite. The calcium monoaluminate in the cement/binder has three advantages over other calcium aluminate phases: 1) The calcium monoaluminate is incorporated in the mold because it has a fast setting response (although not as fast as mayenite) and it is believed to provide the mold with strength during the early stages of curing. The rapid generation of mold strength provides dimensional stability of the casting mold, and this feature improves the dimensional consistency of the final cast component. 2) The calcium monoaluminate is chemically stable with regard to the titanium and titanium aluminide alloys that are being cast. The calcium monoaluminate in one example is used relative to the calcium dialuminate, and other calcium aluminate phases with higher alumina activity; these phases are more reactive with titanium and titanium aluminide alloys that are being cast. 3) The calcium monoaluminate and calcium dialuminate are low expansion phases and are understood to prevent the formation of high levels of stress in the mold during curing, dewaxing, and subsequent casting. The thermal expansion behavior of calcium monoaluminate is a close match with alumina.

The Mold and Casting Methods

One aspect of the present disclosure is a method for forming a casting mold for titanium and titanium alloys and articles, the method comprising: combining calcium aluminate with a liquid to produce a slurry of calcium aluminate, wherein the percentage of solids in the initial calcium aluminate/liquid mixture is about 60% to about 80% and the viscosity of the slurry is about 10 to about 250 centipoise; adding calcium titanate particles into the slurry; adding oxide particles into the slurry such that the solids in the final calcium aluminate/liquid mixture with the large-scale (greater than 50 microns) oxide particles is about 65% to about 90%; introducing the slurry into a mold cavity that contains a fugitive pattern; and allowing the slurry to cure in the mold cavity to form a mold for use in casting titanium and titanium alloys and articles. The percentage of solids is defined as the total solids in the mix divided by the total mass of the liquid and solids in the mix, described as a percentage.

One aspect of the present disclosure is a method for forming a casting mold for titanium and titanium alloys and articles, the method comprising: combining calcium aluminate with a liquid to produce a slurry of calcium aluminate, wherein the percentage of solids in the initial calcium aluminate/liquid mixture is about 60% to about 80% and the viscosity of the slurry is about 10 to about 250 centipoise; adding a combination of particles of calcia and titania; adding oxide particles into the slurry such that the solids in the final calcium aluminate/liquid mixture with the large-scale (greater than 50 microns) oxide particles is about 65% to about 90%; introducing the slurry into a mold cavity that contains a fugitive pattern; and allowing the slurry to cure in the mold cavity to form a mold for use in casting titanium and titanium alloys and articles.

An investment mold is formed by formulating the investment mix of the ceramic components, and pouring the mix into a vessel that contains a fugitive pattern. The investment mold formed on the pattern is allowed to cure thoroughly to form a so-called "green mold." Typically, curing of the green mold is performed for times from 1 hour to 48 hours at temperatures from 15 to 40 degrees C. Subsequently, the fugitive pattern is selectively removed from the green mold by melting, dissolution, ignition, or other known pattern removal technique. Typical methods for wax pattern removal include oven dewax (less than 150 degrees C.), furnace dewax (greater than 150 degrees C.), steam autoclave dewax, and microwave dewaxing.

For casting titanium alloys, and titanium aluminide and its alloys, the green mold then is fired at a temperature above 600 degrees C., preferably 700 to 1400 degrees C., for a time period in excess of 1 hour, preferably 2 to 10 hours, to develop mold strength for casting and to remove any undesirable residual impurities in the mold, such as metallic species (Fe, Ni, Cr), and carbon-containing species. The atmosphere of firing the mold is typically ambient air, although inert gas or a reducing gas atmosphere can be used. The firing process removes the water from the mold. Another purpose of the mold firing procedure is to minimize any free silica that remains in the mold prior to casting. FIGS. 2A and 2B are diagrams showing the composition ranges under consideration as shown in the $CaO$—$TiO_2$—$Al_2O_3$ phase composition space. The bulk composition ranges show the bulk compositions that were used that provided the phases such as calcium aluminate, calcium titanate, and alumina that comprise the mold. FIG. 2A shows the bulk ternary composition space in weight percent for the ranges of alumina, calcia, and titania for the mold compositions that are used in certain embodiments. In particular, as shown in FIG. 2A, in one embodiment, the mold composition ranges are alumina at 15-70 weight percent, calcia at 5-60 weight percent, and titania at 5-55 weight percent. FIG. 2B shows the bulk ternary composition space for the ranges of alumina, calcia, and titania for the mold compositions according to further embodiments. In particular, as shown in FIG. 2B, in one embodiment, the mold composition ranges are alumina at 15-55 weight percent, calcia at 5-60 weight percent, and titania at 5-45 weight percent.

The composition ranges provide the range of phase compositions described in the present disclosure. The range of phase compositions claimed in the present disclosure is 5-50 weight percent calcium titanate ($CaTiO_3$), 15-30 weight percent calcium monoaluminate, 15-30 weight percent calcium dialuminate, and 5-70 weight percent alumina. The calcium titanate can be added in the original mold mix, or the calcium titanate can be generated by reaction of the calcia and titania particles during mold firing.

The firing process also removes the water from the mold and converts the mayenite to calcium aluminate. Another purpose of the mold firing procedure is to minimize any free silica that remains in the mold prior to casting. The mold firing process also serves to convert any residual titania to calcium titanate, calcium aluminotitanate, or similar compounds. Other purposes are to increase the high temperature strength, and increase the amount of calcium monoaluminate and calcium dialuminate.

The mold is heated from room temperature to the final firing temperature, in a controlled manner. The heating rate to the firing temperature, and the cooling rate after firing are typically regulated or controlled. If the mold is heated too quickly, it can crack internally or externally, or both; mold cracking prior to casting is highly undesirable. In addition, if the mold is heated too quickly, the internal surface of the mold can crack and spall off. This can lead to undesirable inclusions in the final casting, and poor surface finish, even if there are no inclusions. Similarly, if the mold is cooled too quickly after reaching the maximum temperature, the mold can also crack internally or externally, or both.

The mold composition described in the present disclosure is particularly suitable for titanium and titanium aluminide alloys. The mold composition after firing and before casting can influence the mold properties, particularly with regard to the constituent phases. In one embodiment, for casting purposes, a high weight fraction of calcium monoaluminate in the mold is used, for example, a weight fraction of 0.15 to 0.8. In addition, for casting purposes, one embodiment minimizes the weight fraction of the mayenite, for example, using a weight fraction of 0.01 to 0.2, because mayenite is water sensitive and it can provide problems with water release and gas generation during casting. After firing, the mold can also contain small weight fractions of aluminosilicates and calcium aluminosilicates. The sum of the weight fraction of aluminosilicates and calcium aluminosilicates may typically be kept to less than 5% in order to minimize reaction of the mold with the casting.

In certain embodiments, the casting-mold composition of the present disclosure comprises an investment casting-mold composition. The investment casting-mold composition comprises a near-net-shape, titanium-containing metal, investment casting mold composition. In one embodiment, the investment casting-mold composition comprises an investment casting-mold composition for casting near-net-shape titanium aluminide articles. The near-net-shape titanium aluminide articles comprise, for example, near-net-shape titanium aluminide turbine blades.

The selection of the correct calcium aluminate cement chemistry and alumina formulation are factors in the performance of the mold during casting. In terms of the calcium aluminate cement, it may be necessary to minimize the amount of free calcium oxide in order to minimize reaction with the titanium alloy. If the calcium oxide concentration in the cement is less than about 10% by weight, the alloy reacts with the mold because the alumina concentration is too high, and the reaction generates undesirable oxygen concentration levels in the casting, gas bubbles, and a poor surface finish in the cast component. If the calcium oxide concentration in the cement is greater than 50% by weight, the mold can be sensitive to pick up of water from the environment. As such, the calcium oxide concentration in the investment mold may typically be kept below 60%. In one embodiment, the calcium oxide concentration in the investment mold is between 10% and 60% by weight. In one embodiment, the calcium oxide concentration in the investment mold is between 15% and 40% by weight. Alternatively, the calcium oxide concentration in the investment mold may be between 25% and 35% by weight.

Prior to casting a molten metal or alloy, the investment mold typically is preheated to a mold casting temperature that is dependent on the particular component geometry or alloy to be cast. For example, a typical mold preheat temperature is 600 degrees C. Typically, the mold temperature range is 450 degrees C. to 1200 degrees C.; in one embodiment the temperature range is 450 degrees C. to 750 degrees C., and in certain cases it is 500 degrees C. to 650 degrees C.

According to one aspect, the molten metal or alloy is poured into the mold using conventional techniques which can include gravity, countergravity, pressure, centrifugal, and other casting techniques known to those skilled in the art. Vacuum or an inert gas atmospheres can be used. For complex shaped thin wall geometries, techniques that use high pressure are used. After the solidified titanium aluminide or alloy casting is cooled typically to less than 650 degrees, for example, to room temperature, it is removed from the mold and finished using conventional techniques, such as, grit blasting, water jet blasting, and polishing.

One aspect of the present disclosure is directed to a casting method for titanium and titanium alloys comprising: obtaining an investment casting-mold composition comprising calcium aluminate, calcium titanate, and aluminum oxide; pouring said investment casting-mold composition into a vessel containing a fugitive pattern; curing said investment casting-mold composition; removing said fugitive pattern from the mold; preheating the mold to a mold casting temperature; pouring molten titanium or titanium alloy into the heated mold; solidifying the molten titanium or titanium alloy; and removing a solidified titanium or titanium alloy from the mold.

Between removing said fugitive pattern from the mold and preheating the mold to a mold casting temperature, the mold is first heated to a temperature of about 450 degrees C. to about 1200 degrees C., and then cooled to room temperature. In one embodiment, between removing said fugitive pattern from the mold and preheating the mold to a mold casting temperature, the mold is first heated to a temperature of about 450 degrees C. to about 1200 degrees C., and then maintained at a casting temperature of about 450 degrees C. to about 850 degrees C.

In one embodiment, the curing step is conducted at temperatures below about 30 degrees C. for between one hour to 48 hours. The removing of the fugitive pattern includes the step of melting, dissolution, ignition, oven dewaxing, furnace dewaxing, steam autoclave dewaxing, or microwave dewaxing. In one embodiment, after removing of the titanium or titanium alloy from the mold, the casting may be finished with grit blasting, water get blasting, or polishing. After the solidified casting is removed from the mold, it is inspected by X-ray or neutron radiography.

The solidified casting is subjected to surface inspection and X-ray radiography after casting and finishing to detect any sub-surface inclusion particles at any location within the casting. X-ray radiography is employed to find inclusions that are not detectable by visual inspection of the exterior surface of the casting. The titanium aluminide casting is subjected to X-ray radiography (film or digital) using conventional X-ray equipment to provide an X-ray radiograph that then is inspected or analyzed to determine if any sub-surface inclusions are present within the titanium aluminide casting.

Another aspect of the present disclosure is a method for forming a casting mold for casting a titanium-containing article. The method includes: combining calcium aluminate and calcium titanate with a liquid, such as water, to produce a slurry of calcium aluminate and calcium titanate in the liquid; introducing the slurry into a vessel that contains a fugitive pattern; and allowing the slurry to cure in the mold cavity to form a mold of a titanium-containing article. In one embodiment, the method further comprises, before introducing the slurry into a mold cavity, introducing oxide particles, for example hollow oxide particles, to the slurry. In another embodiment, silica is combined with the calcium aluminate and calcium titanate. The silica can be added as colloidal silica and/or particulate silica (e.g., powder). For example, in a particular embodiment, colloidal silica is mixed with the calcium aluminate prior to or at the same time of combining the calcium aluminate and the calcium titanate. In another particular embodiment, particulate silica is mixed with the calcium aluminate prior to or at the same time of combining the calcium aluminate and the calcium titanate. In another embodiment, the calcia and titania can be added as calcium titanate, or as a combination of separate particles of calcia and titania; these would be fine-scale particles of a size less than 50 microns. If the calcium titanate is added as a combination of separate particles of calcia and titania, the particles can be reacted during the mold firing cycle to produce calcium titanate. In one embodiment, the calcium titanate is added as pre-formulated calcium titanate, rather than as calcia and titania.

The formed mold may be a green mold, and the method may further comprise firing the green mold. In one embodiment, the casting mold comprises an investment casting mold, for example, for casting a titanium-containing article. In one embodiment, the titanium-containing article comprises a titanium aluminide article. In one embodiment, the investment casting-mold composition comprises an investment casting-mold composition for casting near-net-shape titanium aluminide articles. The near-net-shape titanium aluminide articles may comprise near-net-shape titanium aluminide turbine blades. In one embodiment, the disclosure is directed to a mold formed from a titanium-containing article casting-mold composition, comprising calcium aluminate. Another aspect of the present disclosure is directed to an article formed in the aforementioned mold.

Yet another aspect of the present disclosure is a titanium or titanium alloy casting made by a casting method comprising: obtaining an investment casting mold composition comprising calcium aluminate, calcium titanate, and aluminum oxide; pouring said investment casting mold composition into a vessel containing a fugitive pattern; curing said investment casting mold composition; removing said fugitive pattern from the mold; preheating the mold to a mold casting temperature; pouring molten titanium or titanium alloy into the heated mold; solidifying the molten titanium or titanium alloy to form the casting; and removing a solidified titanium or titanium alloy casting from the mold.

Surface roughness is one of the indices representing the surface integrity of cast and machined parts. Surface roughness is characterized by the centerline average roughness value "Ra", as well as the average peak-to-valley distance "Rz" in a designated area as measured by optical profilometry. A roughness value can either be calculated on a profile or on a surface. The profile roughness parameter (Ra, Rq, . . . ) are more common. Each of the roughness parameters is calculated using a formula for describing the surface. There are many different roughness parameters in use, but $R_a$ is by far the most common.

The average roughness, Ra, is expressed in units of height. In the Imperial (English) system, 1 $R^a$ is typically expressed in "millionths" of an inch. This is also referred to as "microinches". The Ra values indicated herein refer to microinches. An Ra value of 70 corresponds to approximately 2 microns; and an Ra value of 35 corresponds to approximately 1 micron. It is typically required that the surface of high performance articles, such as turbine blades, turbine vanes/nozzles, turbochargers, reciprocating engine valves, pistons, and the like, have an Ra of about 20 or less. One aspect of the present disclosure is a turbine blade comprising titanium or titanium alloy and having an average roughness, Ra, of less than 15 across at least a portion of its surface area.

As the molten metals are heated higher and higher, they tend to become more and more reactive (e.g., undergoing unwanted reactions with the mold surface). Such reactions lead to the formation of impurities that contaminate the metal parts, which result in various detrimental consequences. The presence of impurities shifts the composition of the metal such that it may not meet the desired standard, thereby disallowing the use of the cast piece for the intended application. Moreover, the presence of the impurities can detrimentally affect the mechanical properties of the metallic material (e.g., lowering the strength of the material).

Furthermore, it is understood that such reactions can lead to surface texturing, which results in substantial, undesirable roughness on the surface of the cast piece. For example, using the surface roughness value Ra, as known in the art for characterizing surface roughness, cast pieces utilizing stainless steel alloys and/or titanium alloys typically exhibit an Ra value between about 100 and 200 under good working conditions. These detrimental effects drive one to use lower temperatures for filling molds. However, if the temperature of the molten metal is not heated enough, the casting material can cool too quickly, leading to incomplete filling of the cast mold.

One aspect of the present disclosure is directed to a mold composition for casting a titanium-containing article, comprising calcium aluminate and calcium titanate. The mold composition further comprises hollow alumina particles. The article comprises a metallic article. In one embodiment, the article comprises a titanium aluminide-containing article. In another embodiment, the article comprises a titanium aluminide turbine blade. In yet another embodiment, the article comprises a near-net-shape, titanium aluminide turbine blade. This near-net-shape, titanium aluminide turbine blade may require little or no material removal prior to installation.

EXAMPLES

The disclosure, having been generally described, may be more readily understood by reference to the following examples, which are included merely for purposes of illustration of certain aspects and embodiments of the present disclosure, and are not intended to limit the disclosure in any way.

Figure 1:
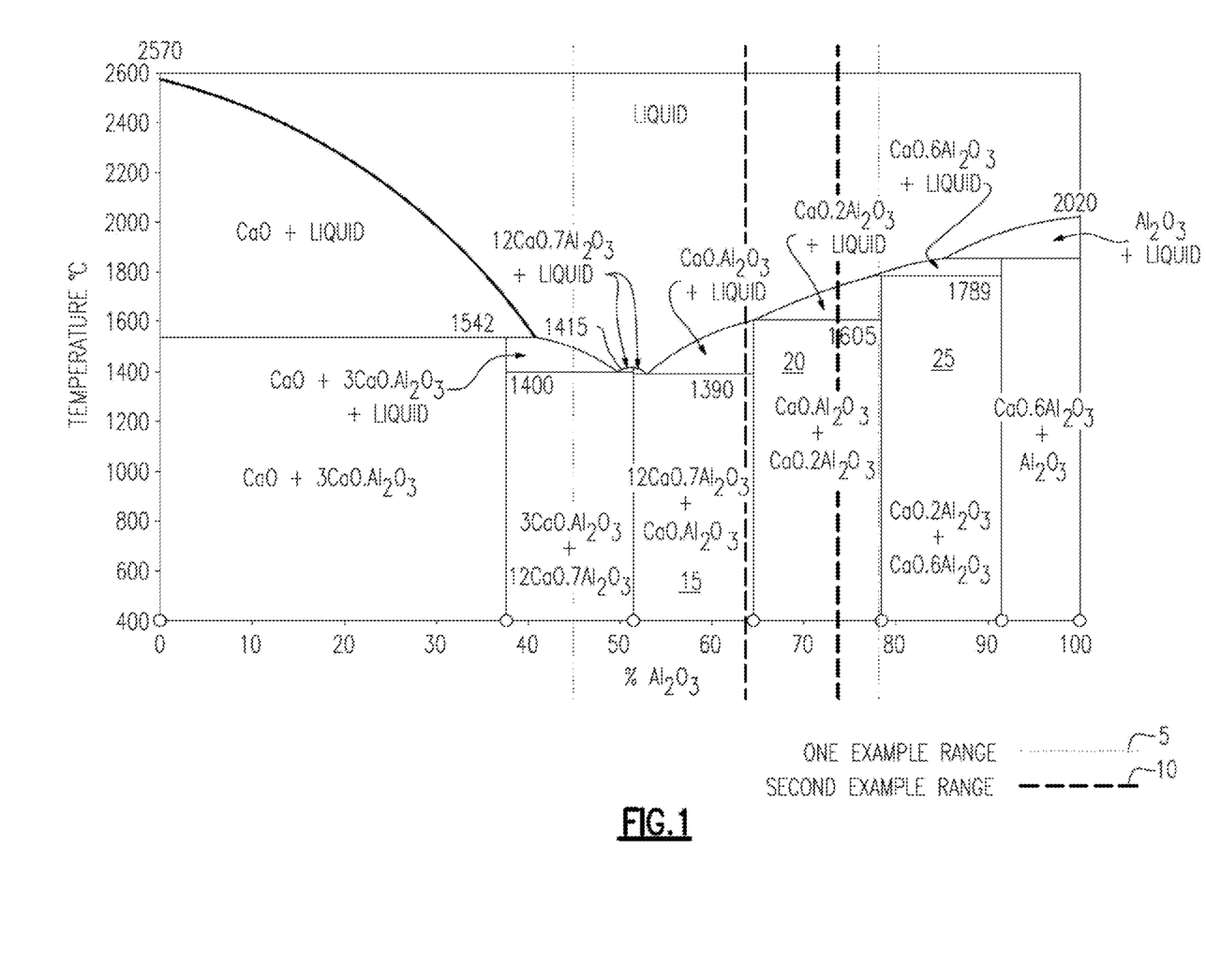
FIG. 1 is the binary calcia-alumina phase diagram that shows the constituent phases that can exist in the calcium aluminate cement as a function of the percentage of aluminum oxide on the x axis and temperature on the y axis.

FIG. 1 is a phase diagram that shows the stable calcium aluminate phases as a function of alumina and calcia compositions and temperature. FIG. 1 shows example composition ranges for the calcium aluminate cement, according to disclosed embodiments. FIG. 1 depicts the percentage of aluminum oxide on the x axis and temperature on the y axis. One example range 5 shows the example composition ranges and the phases for mayenite and calcium monoaluminate 15, calcium dialuminate and calcium monoaluminate 20. Another example range 10 shows the example composition ranges and phase primarily including calcium dialuminate and calcium monoaluminate. Outside of both ranges 5, 10 is the calcium dialuminate and calcium hexyluminate 25.

FIGS. 2A and 2B show various composition ranges for alumina, calcia, and titania as used for the molds of the present disclosure. These bulk composition ranges show the bulk compositions that were used that provided the phases such as calcium aluminate, calcium titanate, and alumina that comprise the mold. FIG. 2A shows a mold composition having ranges for alumina, calcia, and titania as follows: alumina at 15-70 weight percent, calcia at 5-60 weight percent, and titania at 5-55 weight percent. FIG. 2B shows a mold composition having ranges for alumina, calcia, and titania as follows: alumina at 15-55 weight percent, calcia at 5-60 weight percent, and titania at 5-45 weight percent.

Investment Mold Composition and Formulation

A calcium aluminate cement was mixed with calcium titanate and alumina to generate an investment mold mix, and a range of investment mold chemistries were tested. The investment mixture in one example consisted of calcium aluminate cement with 70% alumina and 30% calcia, calcium titanate particles, alumina particles, water, and colloidal silica.

Figure 3A:
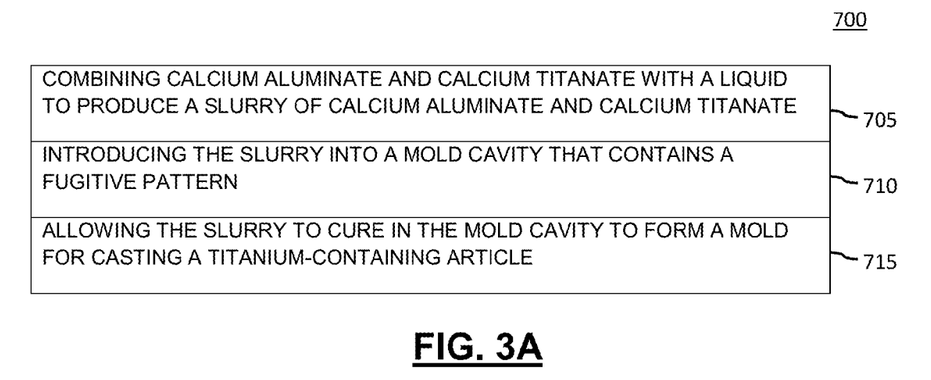
FIG. 3A shows a flow chart, in accordance with aspects of the disclosure, illustrating a method for forming a casting mold for casting a titanium-containing article according to one embodiment.

As shown in FIG. 3A, the method 700 comprises combining calcium aluminate and calcium titanate with a liquid to produce a slurry of calcium aluminate and calcium titanate in the liquid 705. The calcium aluminate slurry is introduced into a mold cavity that contains a fugitive pattern 710. The slurry is allowed to cure in the mold cavity to form a mold for casting a titanium article 715.

Figure 3B:
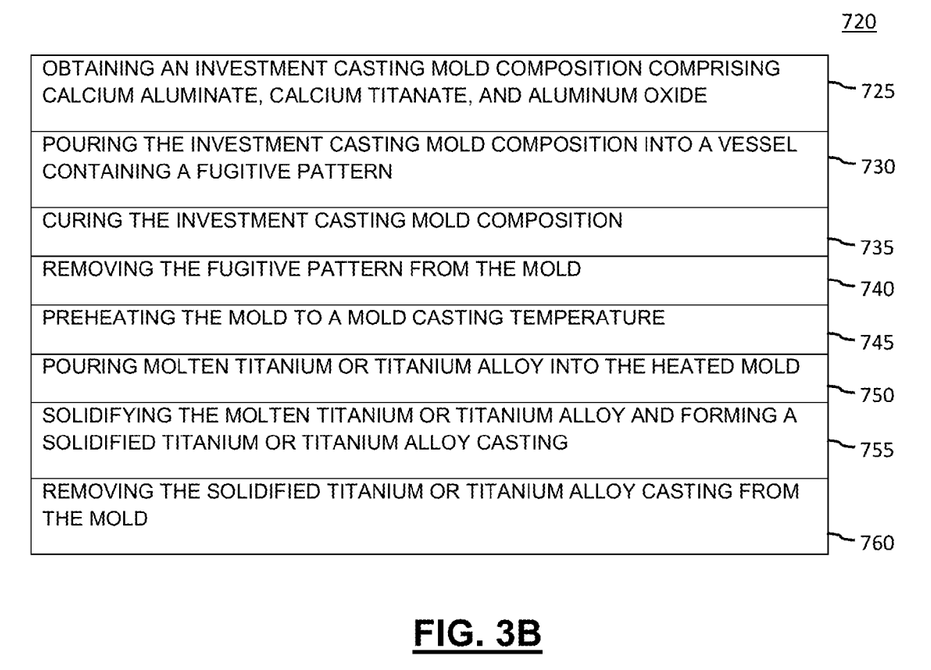
FIG. 3B shows a flow chart, in accordance with aspects of the disclosure, illustrating a casting method for titanium and titanium alloys according to an embodiment.

As shown in FIG. 3B, the method 720 comprises obtaining an investment casting mold composition comprising calcium aluminate, calcium titanate, and aluminum oxide 725. The investment casting mold composition is poured into a vessel containing a fugitive pattern 730. The investment casting mold composition is cured 735, and the fugitive is removed from the mold 740. The mold is then fired and preheated to a mold casting temperature 745 and the molten titanium or titanium alloy is poured into the heated mold 750. The molten titanium or titanium alloy is solidified and forms a solidified titanium or titanium alloy casting 755. Finally, the solidified titanium or titanium alloy casting is removed from the mold 760.

In a particular embodiment, the mold mix is prepared by mixing the cement, water, and collodial silica in a container. Another embodiment uses a high-shear form of mixing. If not mixed appropriately the cement can gel. When the cement is in suspension in the mixture, the alumina particles are added. When the fine-scale alumina particles are fully mixed with the cement, the calcium titanate particles are added and mixed with the cement slurry. When the fine-scale calcium titanate particulate are fully mixed with the cement, the larger-size (for example 0.5-1.0 mm) alumina particles are added and mixed with the cement-alumina formulation. The viscosity of the final mix must not be too low or too high, as will be described subsequently. After mixing, the investment mix is poured in a controlled manner into a vessel that contains the fugitive wax pattern. The vessel provides the external geometry of the mold, and the fugitive pattern generates the internal geometry. The correct pour speed is a further feature; if it is too fast air can be entrapped in the mold, if it is too slow separation of the cement and the alumina particulate can occur.

In a first example, a slurry mixture for making an investment mold consisted of 2708 g of a commercially blended 80% calcium aluminate cement, CA25C, containing calcium monoaluminate $CaAl_2O_4$, calcium dialuminate, $(CaAl_4O_7)$, and mayenite. $(Ca_{12}Al_{14}O_{33})$. The CA25C product nominally consists of a 70% calcium aluminate cement blended with alumina to adjust the composition to 80% alumina. A cement slurry with an initial percentage of solids of 75.6 percent was produced using 820.5 g of deionized water, and 90.5 g of colloidal silica (e.g., Remet LP30, Remet SP30, Nalco 1030). When the slurry was mixed to an acceptable viscosity, 736 g of calcium titanate, $CaTiO_3$, of a size range of less than 43 microns was added to the slurry. The percentage of solids of the mix with the calcium titanate added was 79.1%. When the slurry was mixed to an acceptable viscosity, 736 g of alumina bubble of a size range of less than 0.85 mm and greater than 0.5 mm was added to the slurry. After mixing, the viscosity of the final mix was high, but the investment mold mix was poured in a controlled manner into a vessel to make a mold. The percentage of solids of the final mold mix was 82.6%. The mold was fired at a temperature of 1000° C. for 4 hours. A fired mold with a density of 2.05 g/cc was produced. The mold possessed an unacceptable level of cracks after firing. The final mold composition without the water contained 64.8 percent blended calcium aluminate cement (CA25C), 17.6 percent $CaTiO_3$, and 17.6 percent alumina bubble. The fired mold was analyzed using X-ray diffraction and the mold was found to contain 19.1 percent $CaTiO_3$, 20.1 percent calcium monoaluminate, 24.5 percent calcium dialuminate, and 36.2 percent alumina. The mold possessed lower alumina activity from those taught by the prior art.

In a second example, a slurry mixture for making an investment mold consisted of 2708 g of a commercially blended 80% calcium aluminate cement, CA25C. A cement slurry with an initial percentage of solids of 75.6 percent was produced using 820.5 g of deionized water, and 90.5 g of colloidal silica. When the slurry was mixed to an acceptable viscosity, 1472 g of calcium titanate, $CaTiO_3$, of a size range of less than 43 microns was added to the slurry. The viscosity of the final mix of CA25C and calcium titanate was unacceptably high, but the investment mold mix was poured with some difficulty into a vessel to make a mold. The percentage of solids of the final mold mix was 82.6%. The final mold composition without the water contained 64.8 percent calcium aluminate cement, and 35.2 percent $CaTiO_3$. The mold quality after firing was not acceptable. The fired mold was analyzed using X-ray diffraction and the mold was found to contain 37.3 percent $CaTiO_3$, 20.1 percent calcium monoaluminate, 18.0 percent calcium dialuminate, and 24.6 percent alumina. The fired mold possess has increase in calcium titanate and reduced alumina activity from that taught in example 1; it also has less calcium dialuminate, and a similar amount of calcium monoaluminate.

In a third example, a slurry mixture for making an investment mold consisted of 1354 g of a commercially blended 80% calcium aluminate cement, CA25C. A cement slurry with an initial percentage of solids of 61.0 percent was produced using 820.5 g of deionized water, and 90.5 g of colloidal silica. When the slurry was mixed to an acceptable viscosity, 2090 g of calcium titanate, $CaTiO_3$, of a size range of less than 43 microns, was added to the slurry. The percentage of solids of the mix with the calcium titanate added was 79.7%. The viscosity of the mix was high, and almost unacceptable. At this point, 736 g of alumina bubble of a size range of less than 0.85 mm and greater than 0.5 mm was added to the slurry. After mixing, the viscosity was too high and the investment mold mix was difficult to pour in a controlled manner into a vessel. The percentage of solids of the final mold mix was 82.6%. The mold was fired and it possessed an unacceptable level of cracks. A mold with a density of 2.1 g/cc was produced; the density was higher than the molds of the previous examples. The final mold composition without the water contained 32.4 percent blended calcium aluminate cement (CA25C), 50.0 percent calcium titanate, and 17.6 percent alumina bubble.

In a fourth example, a slurry mixture for making an investment mold consisted of 1354 g of a commercially blended 80% calcium aluminate cement, CA25C. A cement slurry with an initial percentage of solids of 61.0 percent was produced using 820.5 g of deionized water, and 90.5 g of colloidal silica. When the slurry was mixed to an acceptable viscosity, 1354 g of calcium titanate, $CaTiO_3$, was added to the slurry. The percentage of solids of the mix with the calcium titanate added was 75.6%. The slurry was mixed easily to a condition where the uniformity of the dispersion in the mix was acceptable and the viscosity was approximately 100 centipoise. When the slurry was mixed to an acceptable viscosity, 1472 g of alumina bubble of a size range of less than 0.85 mm and greater than 0.5 mm was added to the slurry. After mixing the investment mold mix, the final mix possessed an acceptable viscosity, and it was poured in a controlled manner into a vessel. The percentage of solids of the final mold mix was 82.6%; this falls on the low end of the acceptable range for the percentage of solids in the mix. The mold was fired at 1000 degrees C. for 4 hours, and it possessed acceptable quality. A mold with a density of 1.85 g/cc was produced; the density was less than the molds of the previous examples. The final mold composition without the water contained 32.4 percent calcium aluminate cement, 32.4.0 percent $CaTiO_3$, and 35.2 percent alumina bubble.

In a fifth example, a slurry mixture for making an investment mold consisted of 2708 g of a commercially blended 80% calcium aluminate cement. A cement slurry with an initial percentage of solids of 61.0 percent was produced using 1641 g of deionized water, and 181 g of colloidal silica. When the slurry was mixed to an acceptable viscosity, 2708 g of calcium titanate was added to the slurry. The percentage of solids of the mix with the calcium titanate added was 82.6%. When the slurry was mixed to an acceptable viscosity, 2943 g of alumina bubble of a size range of less than 0.85 mm and greater than 0.5 mm was added to the slurry. After mixing, the investment mold mix was poured in a controlled manner into a vessel. The percentage of solids of the final mold mix was 82.6.1%. This formulation produced a mold that was approximately 125 mm diameter and 400 mm long. The mold was then cured and fired at high temperature. The mold was uniform along its length. A mold with a density of 1.85 g/cc was produced. The final mold composition without the water contained 32.4 percent calcium aluminate cement, 32.4.0 percent calcium titanate, and 35.2 percent alumina bubble.

The very low silica content in the mold can limit reaction with the molten titanium and titanium aluminide alloys when the mold is filled during casting. The bulk composition of silica in the mold was 0.6 weight percent. The low silica content of the mold provides a mold that is used for casting titanium and titanium aluminide alloys. The mold so produced experienced less than 1 percent linear shrinkage on firing.

The working time of the investment mold mix during mold making in one example should be between 30 seconds and 10 minutes. If the working time of the investment mold mix is too short, there is insufficient time to make large molds of complex-shaped components. If the working time of the investment mold mix is too long and the calcium aluminate cement does not cure sufficiently quickly, separation of the fine-scale calcium aluminate cement, the calcium titanate, and the large-scale alumina can occur, and this can lead to a segregated mold in which the formulation varies and the resulting mold properties are not uniform.

The three phases in the calcium aluminate cement, or binder, are calcium monoaluminate, calcium dialuminate, and mayenite, and they are selected for several reasons. First, the phases dissolve or partially dissolve and form a suspension that can support all the aggregate phases in the subsequent investment mold making slurry. Second, the phases promote setting or curing of the mold after pouring. Third, the phases provide strength to the mold during and after casting. Fourth, the phases exhibit minimum reaction with the titanium alloys that is cast in the mold. Fifth, the mold have a suitable thermal expansion match with the titanium alloy casting in order to minimize the thermal stress on the part that is generated during post-solidification cooling.

The calcium monoaluminate and calcium dialuminate are low expansion phases and prevent the formation of high levels of stress in the mold during curing, dewaxing, and subsequent casting. The thermal expansion behavior of calcium monoaluminate is a close match with alumina, and it is a better match with the titanium and titanium aluminide alloy castings. The thermal expansion behavior of calcium titanate is a close match with alumina, and it is a better match with the titanium and titanium aluminide alloy castings.

The mayenite is incorporated in the mold because it is a fast setting calcium aluminate and it provides the cement with strength during the early stages of curing. Curing in one embodiment is performed at low temperatures, because the fugitive wax pattern is temperature sensitive and loses its shape and properties on thermal exposure above about 35 deg C. In one example the mold is cured at temperatures below 30 deg C.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A mold composition for casting a titanium-containing article, comprising:
   calcium titanate; and
   a calcium aluminate cement comprising calcium monoaluminate.

2. The mold composition as recited in claim 1, wherein said calcium titanate comprises particles that are less than about 100 microns in outside dimension.

3. The mold composition as recited in claim 1, wherein said calcium titanate comprises from about 5% by weight to about 50% by weight of the mold composition.

4. The mold composition as recited in claim 1, further comprising aluminum oxide particles.

5. The mold composition as recited in claim 4, wherein said aluminum oxide particles comprise particles that are less than about 10 millimeters in outside dimension.

6. The mold composition as recited in claim 4, wherein said aluminum oxide particles comprise from about 5% by weight to about 70% by weight of the mold composition.

7. The mold composition as recited in claim 1, wherein said calcium aluminate cement comprises more than 20% by weight of the mold composition.

8. The mold composition as recited in claim 1, wherein said calcium aluminate cement further comprises calcium dialuminate, mayenite, or both calcium dialuminate and mayenite.

9. The mold composition as recited in claim 8, wherein said calcium monoaluminate comprises a weight fraction of about 0.05 to about 0.95; wherein said calcium dialuminate comprises a weight fraction of about 0.05 to about 0.80; and wherein said mayenite comprises a weight fraction of about 0.01 to about 0.30.

10. The mold composition as recited in claim 1, further comprising oxide particles.

11. The mold composition as recited in claim 10, wherein said oxide particles comprise aluminum oxide particles, magnesium oxide particles, calcium oxide particles, zirconium oxide particles, titanium oxide particles, silicon oxide particles, or combinations thereof.

12. The mold composition as recited in claim 10, wherein said oxide particles comprise hollow oxide particles.

13. The mold composition as recited in claim 12, wherein said hollow oxide particles comprise hollow alumina particles.

14. The mold composition as recited in claim 1, further comprising calcium oxide.

15. The mold composition as recited in claim 14, wherein said calcium oxide comprises more than about 10% by weight and less than about 50% by weight of the mold composition.

16. The mold composition as recited in claim 1, further comprising titanium oxide.

17. The mold composition as recited in claim 16, wherein said titanium oxide comprises more than about 5% by weight and less than about 55% by weight of the mold composition.

18. The mold composition as recited in claim 1, further comprising silica.

19. The mold composition as recited in claim 1, wherein said mold composition comprises an investment casting mold composition for casting near-net-shape titanium aluminide articles.

20. A method for forming a casting mold for casting a titanium-containing article, said method comprising:
   combining calcium aluminate and calcium titanate with a liquid to produce a slurry of calcium aluminate and calcium titanate in the liquid;
   introducing the slurry into a mold cavity that contains a fugitive pattern; and
   allowing the slurry to cure in the mold cavity to form the casting mold of the titanium-containing article.

21. The method as recited in claim 20, wherein the method further comprises, before introducing the slurry into a mold cavity, introducing oxide particles to the slurry.

22. The method as recited in as recited in claim 21, wherein said oxide particles comprise aluminum oxide particles, magnesium oxide particles, calcium oxide particles, zirconium oxide particles, titanium oxide particles, silicon oxide particles, and compositions thereof.

23. The method as recited in claim 21, wherein said oxide particles comprise hollow oxide particles.

24. The method as recited in claim 23, wherein said hollow oxide particles comprise hollow alumina spheres.

25. The method as recited in claim 20, wherein silica is mixed with the calcium aluminate prior to combining the calcium aluminate and the calcium titanate with the liquid to produce the slurry, wherein said silica is provided as colloidal silica and/or particulate silica.

26. The method as recited in claim 20, wherein said casting mold comprises an investment casting mold for casting near-net-shape titanium aluminide articles.

27. The method as recited in claim 20, wherein the titanium-containing article comprises a titanium aluminide turbine blade.

28. The method as recited in claim 20, wherein the titanium-containing article comprises a near-net-shape, titanium aluminide turbine blade requiring little or no material removal prior to installation.

29. A casting method for titanium and titanium alloys comprising:
   obtaining an investment casting mold composition comprising calcium aluminate, calcium titanate, and aluminum oxide;

pouring said investment casting mold composition into a vessel containing a fugitive pattern;
curing said investment casting mold composition;
removing said fugitive pattern from the mold;
preheating the mold to a mold casting temperature;
pouring molten titanium or titanium alloy into the heated mold;
solidifying the molten titanium or titanium alloy and forming a solidified titanium or titanium alloy casting; and
removing the solidified titanium or titanium alloy casting from the mold.

30. The casting method as recited in claim 29, wherein, between removing said fugitive pattern from the mold and preheating the mold to a mold casting temperature, heating said mold to a temperature of about 450 degrees Celsius to about 1200 degrees Celsius, and then allowing said mold to cool to about room temperature.

31. The casting method as recited in claim 29, wherein, between removing said fugitive pattern from the mold and preheating the mold to a mold casting temperature, heating said mold to a temperature of about 450 degrees Celsius to about 1200 degrees Celsius, and then allowing said mold to be maintained at a casting temperature of about 450 degrees Celsius to about 850 degrees Celsius for casting.

32. The casting method as recited in claim 29, wherein the removing of the fugitive pattern comprises at least one of melting, dissolution, ignition, oven dewaxing, furnace dewaxing, steam autoclave dewaxing, or microwave dewaxing.

* * * * *